(No Model.)

E. R. KNOWLES.
ELECTRIC METER.

No. 408,016. Patented July 30, 1889.

ATTEST,
Ferdinand Strick
W. J. Rosenbaum

INVENTOR,
Edward R. Knowles
W. J. Johnston

UNITED STATES PATENT OFFICE.

EDWARD R. KNOWLES, OF BROOKLYN, NEW YORK, ASSIGNOR, BY MESNE ASSIGNMENTS, TO THE MUTUAL ELECTRIC MANUFACTURING COMPANY, OF NEW YORK.

ELECTRIC METER.

SPECIFICATION forming part of Letters Patent No. 408,016, dated July 30, 1889.

Application filed October 29, 1888. Serial No. 289,414. (No model.)

*To all whom it may concern:*

Be it known that I, EDWARD R. KNOWLES, a citizen of the United States, residing in Brooklyn, in the county of Kings and State of New York, have invented certain new and useful Improvements in Electric Meters, of which the following is a full, clear, and exact specification.

The invention pertains to the measurement of the electric current, the object being to provide a registering-meter which will operate with great efficiency in the measurement of both continuous and alternating currents, have few parts, and adapted to be utilized either as a volt or ammeter, or as a Watt meter, by making the proper changes in the registering apparatus. A surface bearing a series of contacts is caused to move at regular intervals a distance equal to its length, and during such movement to close the register-operating circuit a number of times equal or according to the strength of current flowing at the time.

The details of the apparatus will now be described with reference to the accompanying drawings, in which—

Figure 1:
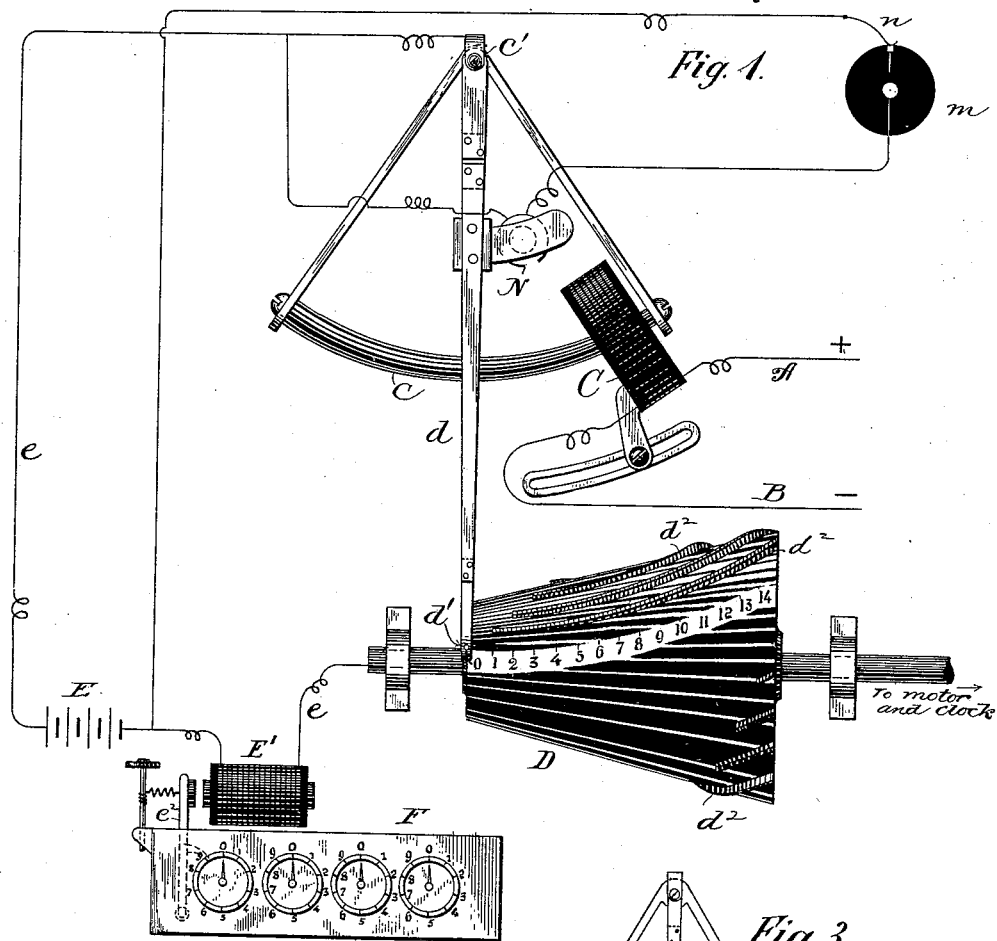

Figure 1 represents a diagrammatical view of the complete apparatus; Figs. 2, 3, 4, and 5, modifications of portions thereof.

A B represent the main circuit, or, rather, the circuit bearing the current to be measured. This circuit includes a solenoid C, whose core $c$ is suspended from a pivot $c'$ through the medium of a suitable frame. There is rigidly connected with this frame an arm $d$, having a spring-tip $d'$ of metal. The frame is moved by the influence of the solenoid and carries the arm with it.

D represents a conical drum mounted upon a shaft which is adapted to be rotated by a motor which is tripped into operation at certain prescribed intervals by a clock. It is not deemed necessary to show the clock-work and motor, inasmuch as it may be of any combination of gearing driven by spring-power. Upon the surface of this drum are arranged a series of curved wings or flanges $d^2$. These flanges are of graduated lengths, the first one being the longest and having placed adjacent to it a scale representing the units of current measurement. The length of the flanges $d^2$ is determined by lines drawn directly around the surface of the cone, cutting the successive points on the scale. Thus the longest flange extends nearly the full length of the cone and ends on a line with the point marked 1. The second flange ends on a line with the point marked 2, and so on throughout the circumference of the cone. It will thus be seen that if a trailer is held stationary over any one of the divisions of the scale—say 5—and the cone rotated five of the flanges will pass directly beneath the trailer. Now, it is obvious that if the arm $d$ be swung over to the right until the point $d'$ rests over division 5 of the scale the rotation of the cone will cause the point to make contact with five of the flanges, and if the point $d'$ is one of the terminals of an electric circuit and the cone is the other terminal of that circuit the said circuit will be closed five times during the rotation of the cone.

As a matter of fact, an electric circuit is arranged in the manner described. This circuit is represented by $e$, and it includes battery E and electro-magnet E'. The armature of the magnet is connected with a pivoted arm $e^2$, carrying a pawl which is adapted to move the unit-wheel of a register F one notch every time the circuit of the magnet is closed.

The drum D is made conical, in order that the space between the point $d'$ and the surface of the drum may always be the same in whatever position the said point is with respect to the cone.

The operation of the device so far as described is as follows: Let us consider, for example, that the clock-work is set to trip the drum-motor into operation once every hour, and that the actual time of rotation of the drum is practically inappreciable, say a second or two. Now let us suppose that at the end of the first hour the current in the circuit A B has energized solenoid C sufficiently to throw the point $d'$ over to division 4 of the scale. At the end of this hour the clock-work trips the drum-motor into operation and the drum is rotated. In its rotation the first four of the flanges come in contact with the pin $d'$ and close the local circuit $e$ four times, thus turning up four notches on the register. At the end of the second hour we will suppose the point $d'$ stands at division 5 of the scale. The rotation of the drum will then turn the register five points more, and so on, thus making a complete register of the ampère hours.

Owing to the angular position which the arm necessarily assumes there may be a tendency when the contact is made between the end of the arm and a wing or flange to cause the arm to move back a slight extent upon each flange, so that the arm would possibly not make contact with as many flanges as it should. I have provided several devices, which will be described, in order to prevent this. That shown in Fig. 1 consists of a wheel $m$ of insulating material, having a block of metal inserted in its periphery. This wheel is located upon a shaft of the main clockwork, which rotates once an hour, and it is to be arranged so that the metallic block will make contact with a brush $n$ at the moment when the clock trips the drum-motor. The metallic block is one terminal of an electric circuit and the brush is the other. The circuit includes magnet N, having an extended pole-piece. The armature is attached to the arm $d$. When the clock trips the drum-motor, the magnet-circuit is completed, and the arm is held rigidly in its position until the rotation of the drum is completed.

Figure 3:
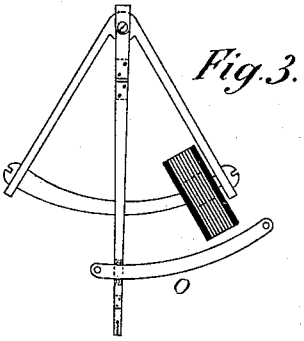
Figure 4:
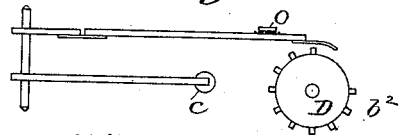

Figs. 3 and 4 show means for accomplishing the same object mechanically. A strip of metal $o$, having a roughened surface, is arranged above the arm, so that when the arm is slightly raised by reason of contact with a flange it comes in contact with the roughened surface of the strip, the frictional contact preventing side movement.

Figure 2:
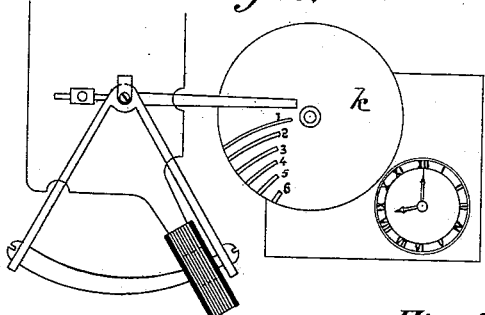

In Fig. 2 is shown a modification wherein a disk $k$ takes the place of the cone or drum. In this case the position of the circuit-closing arm is changed. The flanges are arranged as shown, and when the disk is rotated the indicated number of flanges will close with the arm.

Figure 5:

Fig. 5 shows the arrangement where alternating currents are to be measured. The solenoid consists of two coils connected up with line, so that the attraction upon the core will be constant.

The main solenoid is adjustably mounted upon a bracket, so that it may be adjusted with respect to its core. This provision is made so that the apparatus may be readily put into condition for correct working after it has been taken apart or moved about.

Having described my invention, I claim—

1. In an electric meter, a periodically-moving element provided with a series of continuous flanges or wings of regularly-graduated length, in combination with an element moved by the strength of the current to be measured, the movement of the last-mentioned element always being in a substantially parallel plane to the surface of the contacts upon the first-mentioned element, as set forth.

2. In an electric meter, a contact-arm moved by the strength of the current to be measured, in combination with a rotating drum bearing contact-points upon its surface whose axis is parallel to the plane of movement of said contact-arm, and whose surface is conical, whereby the space between the arm and the surface will be constant for all positions of the drum or arm, substantially as described.

3. In an electric meter, a rotating drum bearing upon its surface the division-marks of a scale, and also a series of continuous contact flanges or wings, the length of the flanges being graduated, so that the beginning of the first one is in line with the first mark on the scale, and the beginning of the succeeding ones, respectively, in line with the succeeding cardinal marks upon the scale, and all ending in line with the last division-mark, in combination with a moving contact-arm controlled by the strength of the current to be measured and adapted to make contact with the flanges on the drum when the latter rotates, whereby an electric circuit is closed, for the purpose described.

4. In an electric meter, the combination, with the drum D, having a fixed location, the solenoid-core $c$, and frame and arm $d$, connected therewith, of the solenoid-magnet C, adjustably mounted with respect to said core, frame, and arm $d$, for the purpose described.

5. In an electric meter, an element adapted to be moved by the strength of the measured current, another element adapted to be moved periodically, the said second element bearing contact points or flanges which are adapted to make contact with the first-mentioned element, all in combination with a device for preventing abnormal movement of one of the elements during the movement of the contact points or flanges past the first-mentioned element.

6. The combination, with the drum having inclined flanges and the arm $d$, moved by the strength of the measured current, of an armature attached to said arm, an electro-magnet in juxtaposition to said armature, and an electric circuit including said magnet.

7. The combination, with the periodically-rotating drum having inclined flanges and the arm $d$, moved by the strength of the measured current, of an armature attached to said arm, an electro-magnet in juxtaposition to said armature, an electric circuit including said magnet, and a circuit-closer operated by the drum-motor when the drum rotates to close said circuit, substantially as described.

In witness whereof I have hereunto signed my name in the presence of two subscribing witnesses.

EDWARD R. KNOWLES.

Witnesses:
 WM. A. ROSENBAUM,
 FRANK C. GRUEN.